United States Patent Office 3,189,610
Patented June 15, 1965

3,189,610
PROCESS FOR PREPARING A PYRIDINE-METAL INTERACTION PRODUCT
Roy Duffy, Widnes, England, assignor to Imperial Chemical Industries Limited, London, England, a corporation of Great Britain
No Drawing. Filed Mar. 15, 1963, Ser. No. 265,334
Claims priority, application Great Britain, Mar. 20, 1962, 10,643/62; Oct. 19, 1962, 39,621/62
25 Claims. (Cl. 260—270)

This invention relates to an organic chemical process useful for the manufacture of organic bases, and more particularly for the manufacture of bipyridyls.

Bipyridyls may be made by interacting a metal and a pyridine and oxidising the interaction product so formed. Very active metals such as sodium require no initiator, but other less active metals such as magnesium and aluminium commonly require the addition of a small proportion of an initiator or promotor to assist the interaction.

It has now been found that interaction can, in the case of the less active metals, be initiated or promoted readily and conveniently by a pyridinium salt.

This promoter has the advantage of being much more stable and convenient a material to handle than an alkali metal dispersion, so that its use reduces the hazards of the procedure very considerably.

Thus according to this invention there is provided, in a process for the interaction of a metal and a pyridine, the step of adding a pyridinium salt as a promotor for the said interaction.

The pyridinium salt may be a salt derived from a pyridine and an acid. Owing to the weakly basic nature of pyridines, a strong acid is usually desirable for a substantial degree of salt formation to occur. In particular, suitable pyridinium salts are the salts of pyridines with strong mineral acids, for example pyridine hydrochloride and pyridine hydrobromide.

The pyridinium salt may alternatively be a quaternary pyridinium salt. In these pyridinium salts, the nitrogen atom of the pyridine ring carries a positive charge and an organic radical as a substituent. Suitable examples of quaternary pyridinium salts include N-alkyl pyridinium salts (particularly the halides, for example N-methyl pyridinium iodide (pyridine methiodide), N-ethyl pyridinium bromide and N-methyl pyridinium chloride, and corresponding N-aralkyl- and N-alkenyl-pyridinium salts for example N-benzyl-pyridinium bromide and N-allyl-pyridinium bromide.

The pyridinium salt may be used in the form of a previously prepared salt, or it may be formed in situ from a suitable precursor, which may be any material which will react with the pyridine to form a pyridinium salt. Materials which can thus be used to form the pyridinium salt in situ include acids, and especially strong acids for example hydrogen chloride and hydrogen bromide, and any organic compound which can react with the pyridine to form a quaternary pyridinium salt. As water has an adverse effect on the metal-pyridine interaction, the precursor should be as free as possible from it.

Organic compounds capable of forming quaternary pyridinium salts from pyridine are well known in the art and include halogenated hydrocarbons, especially those halogenated hydrocarbons containing the group —$CH_2$·Halogen, i.e. having the structure R.$CH_2$.Halogen wherein R stands for hydrogen or for a hydrocarbon radical which may be aliphatic or aromatic, cyclic or acyclic, saturated or unsaturated in nature, and the halogen is fluorine, chlorine, bromine or iodine. Other halogenated hydrocarbons may also be used, and these may function either by quaternary pyridinium salt formation or by decomposition to give a hydrogen halide. Examples of suitable halogenated hydrocarbons include alkyl, alkenyl and aralkyl halides, and in particular methyl iodide, methyl chloride, ethyl bromide, allyl chloride, allyl bromide, benzyl chloride and benzyl bromide. Allyl chloride is especially useful on account of its efficiency, ready availability and low cost.

Other halogenated hydrocarbons which may also be used if desired are the aryl bromides such as bromobenzene, which are known to form quaternary pyridinium salts slowly by interaction with pyridine, but these tend to produce a slower or delayed initiating action of the magnesium-pyridine interaction compared with that produced by halogenated hydrocarbons of the structure R.$CH_2$.Halogen. Chlorobenzene does not form a quaternary salt, however, and is not suitable for use.

An acid halide for example benzoyl chloride, which can form a quaternary salt by reaction with pyridine, can also be used in the process of this invention.

The simplest method of carrying out the process of this invention will depend to some extent upon the particular conditions and pyridinium salt to be employed. In general, however, the preferred method is that in which the pyridinium salt is formed in situ, as this avoids the necessity for the preparation of the pyridinium salt as a separate operation.

The pyridine from which the pyridinium salt used as reaction initiator is derived is commonly pyridine itself, but may alternatively be a substituted pyridine for example an alkyl pyridine if desired. It is preferred to use a pyridine salt derived from the same pyridine as that used for making metal-pyridine interaction product, however, as this reduces the possibility of contamination of the product by homologues and the like.

The proportion of pyridinium salt to be used is preferably between 1% and 10% by weight of the pyridine used. Alternatively, the proportion may be in terms of the weight of metal, and is then preferably between 5% and 20% by weight of the metal used. Larger proportions tend to produce little additional effect and smaller proportions may in some instances act less quickly or with less certainty, but nevertheless may be used if desired.

When the process of this invention is carried out by formation of the pyridinium salt in situ, using a material which will form a pyridinium salt by interaction with the pyridine, the proportion of such a material to be used is usually that which is sufficient to produce a proportion of pyridinium salt indicated above and so can be found by simple calculation. To avoid necessity for the calculation, however, optimum results may usually be obtained by using a proportion which is within the ranges specified above for the pyridinium salt, though it must be realised that the optimum proportions in any particular instance will depend to a considerable extent upon the molecular weight of the material concerned.

The initiation of the metal-pyridine interaction may be brought about by adding the pyridinium salt or a precursor thereof directly to a mixture of the metal and the pyridine. For this purpose, the pyridinium salt or precursor thereof may be added as such or in the form of a solution or suspension in a diluent or carrier, which is most conveniently the pyridine. Most precursors (and particularly the alkyl, aralkyl and alkenyl halides, containing the group —$CH_2$·Halogen) react very rapidly with pyridine and effectively form the pyridinium salt as soon as they come in contact with the pyridine. The pyridinium salt or its precursor may be mixed first with either the metal or the pyridine before the metal-pyridine mixture is made up. In such circumstances the precursor, and particularly a halogenated hydrocarbon, may react to some degree with the metal (for example magnesium) but this does not interfere with its initiating efficiency, and the mixture so produced can be used as an initiator if desired. Indeed, partial interaction in this way may help to give a clean and active metal surface.

The initiation stage of the metal-pyridine interaction is preferably carried out at or near the boiling point of the reaction mixture (commonly about 115° C. when the pyridine is pyridine itself) and most conveniently under reflux conditions. Lower temperatures, for example temperatures as low as 70° C., may also be used if so desired, but a temperature in the range 100° to 120° C. is usually most useful.

It is also preferred that the process of this invention should be carried out with an inert atmosphere in the reaction vessel. This may be provided conveniently by means of an atmosphere of dry nitrogen, and is preferably maintained throughout the initiation and main interaction stages.

The metal may be any metal which is reactive towards the pyridine but is not adequately self-initiating in its reactivity, and may be in particular magnesium or aluminium. The metal should preferably be clean and as free as possible from oxide coating, and may be for example in the form of turnings, powder or the like. Pure metals may be used or conveniently available alloys containing minor proportions of other metals. In the case of aluminum in particular, it is advantageous to use a material which can break down the surface oxide film of the metal (for example a mercury compound such as mercuric chloride) in conjunction with the promotors we specify above.

The pyridine should be free from any substituent or impurity which can take part in an undesired side reaction, for example with the metal. This process is especially applicable to pyridine itself. Alkyl pyridines, though less reactive may be used if desired. It is also preferred that the pyridine should be substantially dry (i.e. should contain as little water as is practicable, and preferably less than about 0.1% by weight).

Once interaction of the metal and the pyridine has commenced, further quantities of metal and/or pyridine may be added to the reaction vessel and interaction will continue, as the metal-pyridine interaction product itself can usually promote the interaction. Some adjustment of the temperature of the reaction mixture may be required in order to keep the mixture at the optimum temperature for the main interaction stage, for example due to the heat evolved in the interaction, and appropriate heating or cooling may be applied for this purpose. If the rate of interaction slows down unduly, for example due to introduction of materials which interfere with the interaction, further additions of pyridinium salt or precursor may be added as necessary during reaction.

Apart from the initiation step, no significant modification needs to be made to the process of interacting the metal and the pyridine. The general conditions to be used for the interaction of magnesium and the pyridine are substantially those more fully described in copending application, Serial No. 193,627, filed May 9, 1962, and those for the interaction of aluminium and the pyridine are substantially those more fully described in copending application, Serial No. 221,899, filed September 6, 1962. Thus the interaction can be carried out conveniently at temperatures up to the reflux temperature of the mixture, and preferably at a temperature in the range 90–120° C. The time required for the interaction will also vary, and may be varied between 30 minutes and 12 hours, for example, and in most cases will be about 2 to 6 hours. The reaction time and temperature to be used in any particular case may also be varied in accordance with the ratio of bipyridyl isomers in the bipyridyl mixture to be produced from it.

The process of this invention may be operated by batchwise or continuous techniques. It has been found that these promotors are especially convenient for use in continuous techniques, and can then be added continuously or intermittently to the reactor vessel. Likewise, the methods and conditions for conversion of the metal-pyridine interaction product to bipyridyls remain substantially independent of the particular interaction initiator employed. Thus the metal-pyridine interaction product may be oxidized for example by oxygen or air, optionally diluted with an inert gas. Suitable alternative oxidizing agents include organic nitro compounds, nitric acid, hypochlorites and hydrogen peroxide. Also the interaction of the metal and the pyridine may be carried out in the presence of a diluent, which may for example be an excess of the pyridine or an N:N-dialkyl-arylamine, for example, N:N-dimethylaniline, which acts as a solvent diluent therefor, as is more fully described in copending application, Serial No. 208,566, filed July 9, 1962.

The interaction product may also be decomposed by water, as is more fully described in our copending application, Serial No. 264,779, filed March 13, 1963.

In some cases, the blue colour of the metal-pyridine interaction product may be persistent in the decomposition stage, but this can be removed for example by a brief period of oxidation with air.

The process of this invention is very safe and convenient in operation and the promotors used involve the minimum difficulties in storage or use. It has also been found, in many cases, the interaction can be continued for longer periods without adversely affecting the pyridine consumption (as expressed in terms of bipyridyl production). In these respects, these promotors are superior to alkali metals.

The invention is illustrated but not limited by the following examples in which the parts and percentages are by weight.

*Example 1*

A mixture of 23 parts of pyridine (dried over solid potassium hydroxide and redistilled) and 1 part of magnesium turnings was heated to boiling under reflux conditions, with stirring and in an atmosphere of dry nitrogen. Then 1.18 parts of allyl bromide (dried and redistilled) were added, followed by a further 3.33 parts of dry pyridine, and the mixture was maintained at reflux with continued stirring for three hours. Interaction commenced immediately, and the colour of the mixture became dark green, then orange, and finally blue-black. The mixture was then treated with 1.42 parts of distilled water while at the boiling point (approximately 115° C.). The resulting product was found by analysis to contain 13.8% of 4:4'-bipyridyl and 0.2% of 2:4'-bipyridyl.

*Example 2*

A mixture of 23 parts of pyridine (dried over solid potassium hydroxide and redistilled) and 1 part of magnesium turnings was heated to boiling under reflux conditions, with stirring and in an atmosphere of dry nitrogen. Then 1.2 parts of benzyl bromide (dried and redistilled) were added, followed by a further 3.33 parts of dry pyridine, and the mixture was maintained at reflux with continued stirring for 1 hour. Interaction commenced immediately, and the colour of the mixture became bright green, then brown, and finally blue-black. The mixture was then treated with 2.25 parts of distilled water while at the boiling point (approximately 115° C.). The resulting product was found by analysis to contain 10.6% of 4:4'-bipyridyl and 0.2% of 2:4'-bipyridyl.

*Example 3*

A mixture of 395 gm. of pyridine (water content 0.005% by Karl Fischer method), and 12 gm. magnesium turnings was stirred and refluxed in an atmosphere of nitrogen and treated with 2 ml. of allyl chloride. Refluxing was continued for a total of 4 hours, and then the mixture was cooled to 80° C., treated with 25 ml. of water (added gradually during 15 minutes), and finally cooled to ambient temperature. Analysis of the product showed that it contained 273 gm. of unreacted pyridine, 5.2 gm. of 2:2'-bipyridyl and 55.6 gm. of 4:4'-bipyridyl. There was no unreacted magnesium.

*Example 4*

The procedure of Example 3 was repeated using only 1 ml. of allyl chloride. Analysis of the resulting product showed that it contained 278 gm. of unreacted pyridine, 3.4 gm. of 2:2'-bipyridyl and 57.2 gm. of 4:4'-bipyridyl. There was no unreacted magnesium.

*Example 5*

A mixture of 7 parts of allyl bromide and 12 parts of freshly distilled magnesium turnings was heated under reflux conditions for 30 minutes while a stream of oxygen-free nitrogen was passed through the mixture, and then 98 parts of pyridine (dried over potassium hydroxide and redistilled), itself at 20° C., were added slowly. The reaction mixture first became blue-green in colour then orange for about 30 minutes, and then became finally blue-green again. The mixture was refluxed for a further 3 hours, with the addition of a further 98 parts of the pyridine during the first hour, and was then oxidised by addition of an aqueous solution of sodium hypochlorite. The resulting reaction product was found by analysis to contain 9.4 parts of 4:4'-bipyridyl and 1.4 parts of 2:2'-bipyridyl.

*Example 6*

Interaction of a mixture of 10 gm. of aluminium powder and 400 gm. of dry pyridine at reflux temperature was initiated by 1.5 gm. of mercuric chloride followed by 15 gm. of benzyl bromide. The mixture was then refluxed for 2.75 hours, and was then treated with 25 gm. of water. The reaction product was found to contain 21.6 gm. of 4:4'-bipyridyl, representing an efficiency of 22% of theory on the aluminium and 31% of theory on the pyridine consumed.

What is claimed is:

1. In a process for producing a metal-pyridine interaction product by the interaction of a reactive metal with a pyridine, the improvement which comprises utilizing a pyridinium salt to promote said interaction.
2. Process as claimed in claim 1 wherein the pyridinium salt is a salt of a pyridine with a strong mineral acid.
3. Process as claimed in claim 2 wherein the pyridinium salt is selected from the group consisting of pyridine hydrochloride and pyridine hydrobromide.
4. Process as claimed in claim 1 wherein the pyridinium salt is a quaternary pyridinium salt.
5. Process as claimed in claim 1 wherein the pyridinium salt is formed in situ in the metal-pyridine mixture to be interacted.
6. Process as claimed in claim 1 wherein the interaction of the metal and the pyridine is promoted by use of a material which can react with the pyridine to form a pyridinium salt.
7. Process as claimed in claim 6 wherein the material used is a halogenated hydrocarbon.
8. Process as claimed in claim 7 wherein the halogenated hydrocarbon is one containing the group —$CH_2$.Halogen 9. Process as claimed in claim 7 wherein the halogenated hydrocarbon is selected from the group consisting of alkyl, alkenyl and aralkyl halide.

10. Process as claimed in claim 9 wherein the halogenated hydrocarbon is an allyl halide.
11. Process as claimed in claim 1 wherein the promotor is in a proportion between 1% and 10% by weight of the pyridine used.
12. Process as claimed in claim 1 wherein the promotor is used in a proportion between 5% and 20% by weight of the metal used.
13. Process as claimed in claim 1 wherein the pyridine is pyridine itself.
14. Process as claimed in claim 1 wherein the metal is magnesium.
15. Process as claimed in claim 1 wherein the metal is aluminum.
16. Process as claimed in claim 15 wherein the promotor is used in conjunction with a material which can break down the surface oxide film on the metal.
17. Process as claimed in claim 1 wherein the promotor is used at a temperature of at least 70° C.
18. Process as claimed in claim 1 wherein the metal-pyridine interaction product so formed is converted into a bipyridyl.
19. The process of claim 4 wherein the quaternary pyridinium salt is selected from the group consisting of N-alkyl pyridinium salts, N-aralkyl pyridinium salts and N-alkenyl pyridinium salts.
20. The process of claim 10 wherein the halide is selected from the group consisting of bromide and chloride.
21. The process of claim 16 wherein the material which can break down the surface oxide film on the metal is a mercury compound.
22. The process of claim 17 wherein the temperature is within the range of 100° C. to 120° C.
23. The process of claim 18 wherein the bipyridyl is selected from the group consisting of 4:4'-bipyridyl and isomers thereof.
24. In a process for producing a metal-pyridine interaction product wherein a reactive metal is interacted with a compound selected from the group consisting of pyridine and alkyl derivatives thereof, followed by oxidation of said interaction product to the corresponding bipyridyl and recovery of the bipyridyl, the improvement which comprises initiating the interaction by adding a pyridinium salt thereto.
25. In a process for producing a metal-pyridine interaction product wherein a reactive metal is interacted with a compound selected from the group consisting of pyridine and alkyl derivatives thereof in the presence of an excess of said compound, followed by oxidation of said interaction product to the corresponding bipyridyl and recovery of the bipyridyl, the improvement which comprises initiating the interaction by forming a pyridinium salt in situ from the said compound.

References Cited by the Examiner

"Chemical Abstracts," vol. 42, page 5912 (1948), abstracting Arbuzov, "Bull. Acd. Sci. U.R.S.S. Classe Sci. Chem.," pages 451–5 (1945).

Smith: J.A.C.S., vol. 46, pages 414–449 (1924).

IRVING MARCUS, *Primary Examiner.*

JOHN D. RANDOLPH, WALTER A. MODANCE,
*Examiners.*